E. J. GOULD.
EQUALIZING GEAR.
APPLICATION FILED JUNE 24, 1919.

1,372,656.

Patented Mar. 22, 1921.

Edwin J. Gould
INVENTOR

UNITED STATES PATENT OFFICE.

EDWIN J. GOULD, OF OAKLAND, CALIFORNIA, ASSIGNOR TO CHARLES T. HENRY, J. BROOKS MILLARD, AND JOSEPH T. HENRY, ALL OF YORK, PENNSYLVANIA.

EQUALIZING-GEAR.

1,372,656.  Specification of Letters Patent.  Patented Mar. 22, 1921.

Application filed June 24, 1919. Serial No. 306,497.

*To all whom it may concern:*

Be it known that I, EDWIN J. GOULD, citizen of the United States, residing at Oakland, county of Alameda, State of California, have invented certain new and useful Improvements in Equalizing-Gears, whereof the following is a specification.

This invention relates to certain new and useful improvements in equalizing gears for self propelled vehicles, and the like, and has primarily for its object the equalizing for distance in travel of driving wheels, while at the same time preventing the equalizing for resistance on the driving wheels as does the ordinary equalizing, or differential gear, now in use. It has further, for one of its objects, an increase in strength by its novel construction, and an absence of backlash, or lost motion. Other objects and advantages of the invention will hereinafter appear, and the novel features thereof will be particularly pointed out in the appended claims.

Figure 1:
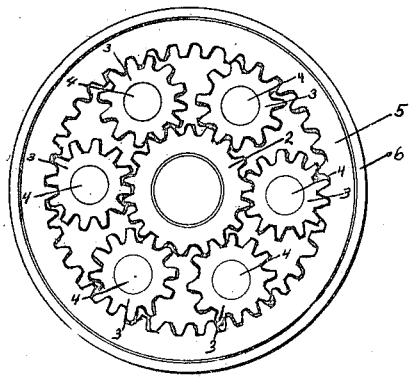
Figure 2:
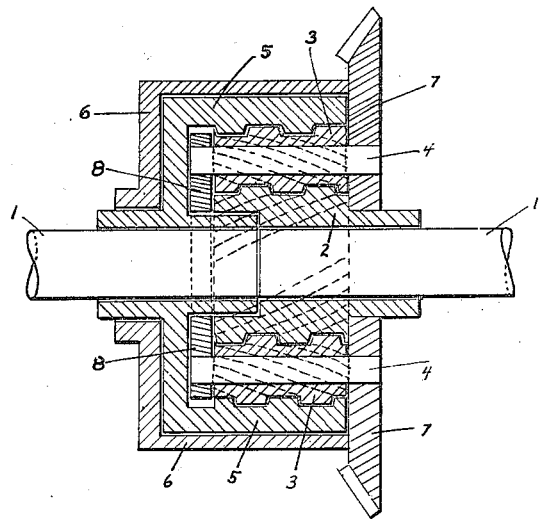

The invention is clearly illustrated in the accompanying drawings, which, with numerals of reference marked thereon, form part of this specification, and in which—Figure 1 is end view, and Fig. 2 is a substantially central transverse section. Like numerals of reference indicate like parts throughout the different views.

Referring to the drawings:

1 designates the adjacent ends of the axle sections; 2 a spiral pinion, or toothed gear, fastened to one axle section; 3 a still smaller toothed gear pinion in mesh with 2, and journaled in driving, or master wheel, 7 of the autocar; 4 are shafts or journals for pinions 3; 5 is an internal spiral gear fastened to one axle section and meshing with pinions 3; 6 is a casing for the whole, to which master wheel 7 is firmly attached; 7 is master or driving wheel, and 8 is a plate having a large hole in its center and having holes duplicate to those in the master wheel to receive journals 4, for the purpose of giving strength by uniting the journals 4, and thus causing the bending strength of any one journal to be greater by the combined strength of the whole number of them.

In driving, the rotation of master wheel 7 transfers power through journals 4 to pinions 3, which pinions distribute it to pinion 2 on one axle section and internal gear 5 on the opposite axle section, and in straight running the whole mechanism rotates as a unit and no relative motion takes place between the members themselves, while when a turn is made, and one wheel tends to turn relatively faster than the master wheel, and the other wheel tends to travel slower than the master wheel, the relative position of the mechanism is changed by the accelerating of the one vehicle wheel, and the retarding of the other vehicle wheel in the following manner:

The pinion 2 for instance, being accelerated from the contained axle, rotates pinions 3 on journals 4 in an opposite direction to that of pinion 2, as is well known with meshed external gears, which causes pinions 3 to travel in internal gear 5 in the same direction, it, (5), is traveling, and the retarding of the wheel connected through its axle to internal gear 5 tends to assist this action, as the action of an internal gear and pinion is always in the same direction—but at different speeds—which would complete the action changing the relative position of the mechanism, and the difference for distance of the wheels will be equalized no matter how much spiral angle is used in the gears.

It is well understood in a combination of gears of this kind that it is necessary for the spiral pinions 2 and 3 to have their teeth cut in different directions, as is indicated by the dotted lines in the drawing, in order for them to mesh, or in other words, one of them is right handed and the other one left handed, while the angle of the teeth in the internal gear 5 must run in the direction of the teeth in pinion 3 in order for these two gears to mesh, or plainly, if pinion 2 has left handed teeth, then pinions 3 and gear 5 must have right handed teeth, and vice versa.

The invention always has spiral teeth of such an angle that an impulse to transfer power through it from one wheel to the other in an opposite direction would be entirely counteracted by the end thrust of the spiral gears, as it must do this in order to equalize for distance only, and not for resistance. It can best be described by naming a right and a left handed pinion, and a right or a left handed internal gear, adapted to mesh with one or the other of the pinions, and the pitch or angle of these must be steep enough to prevent the transmission of power, as such, through it, as in a transmission gear for instance, in order to equalize for distance only, it is then an interlocking device against the transmission of power as in a transmission gear, and can only be released by a power acting in different directions on the inside pinion and internal gear. Should this design be built with straight spur teeth it would not be as efficient in equalizing the power delivered to driving wheels of a motor vehicle as the common balance gear now in use, as the power would be sent from the pinions 3 to pinion 2 at a less distance from axle center than its balanced opposite at internal gear 5, and one wheel would get more power than the other wheel. This is prevented by the spirals exerting end thrust when power is applied, and the power is applied as if the axle was solid. The parallel position of all gears is of great advantage in their end thrust action, as the thrust in opposite directions from pinion 2 to gear 5 is carried by pinions 3 without severe tendency to spread casing 6 apart, while also allowing for great length of toothed surface which gives it extra strength, in an average size gear, while hollow member 8 is designed to give strength to journals 4, and is always in fixed relation to master wheel 7, and moves at the same speed as the master wheel at all times; the center of 8, which, (8), could be called a floating member, is hollowed out to fit loosely around the inside of the hub of the internal gear 5, which hub, is in this instance, shown as projecting inside as well as outside of the wall of gear 5, to give greater strength in mounting on the axle; 8 is also a loose fit inside of the teeth of internal gear 5.

By reference to Fig. 1, it will be readily seen how the equalizing movement takes place, and while the drawing shows six small pinions between internal gear 5 and pinion 2, my preferred construction is to have three of these pinions replaced by solid studs or shafts, secured to master wheel 7, and member 8, which studs would float between teeth of internal gear 5 and pinion 2 to strengthen position of the pinions 3 in their engagement with the internal gear 5 and pinion 2. It will be noted that gear teeth can not crowd out of engagement with this construction, and that there will be no tendency to force gear 5 and pinion 2 out of alinement, as the positions of pinions 3 counter-balance each other in this respect.

Other modifications in details may be resorted to without departing from the spirit of the invention or sacrificing any of its advantages.

What is claimed as new is:—

1. Equalizing gearing, comprising an internal spiral gear with either right or left handed teeth, one or more small pinions adapted to mesh with said internal gear and having teeth at the same angle and direction and disposed parallel in said internal gear, and a single pinion with teeth in a different direction but at the same angle as those of said internal gear and small pinions, and alined and meshed with all of said small pinions for the purpose of allowing a different direction of running to occur in said single pinion and internal gear, when forces in different directions are applied to each of them.

2. Equalizing gearing comprising a centrally located single pinion with spiral teeth, one or more smaller pinions with oppositely directed spiral teeth surrounding the said central pinion and meshing therewith, journals supporting the said smaller pinions, a separate member (as master wheel) in which the said journals are fastened, the said separate member being adapted to run freely on the hub of the said first pinion, an internal gear surrounding and meshed with the said smaller pinions, two alined, abutting axles, one in the first named single pinion and one in the said internal gear, for the purpose of driving the whole mechanism as a unit, by a power applied at the said journals of the second named smaller pinions, and at the same time allowing a difference in speed of the respective axles when a separate power is applied to each to rotate them in opposite directions.

3. An equalizing gearing comprising several small pinions, a master gear to which the said small pinions are journaled, a pinion engaging the said small pinions by means of spirally disposed teeth, an internal gear also engaging the said small pinions, by means of spirally disposed teeth, a live axle driven as a single united shaft in all cases excepting when a separate force operates to turn one section of the axle in one direction and the other axle section in the opposite direction.

4. Equalizing gearing, comprising a live axle, a spirally toothed gear, adapted to cause end thrust mounted on one section of said live axle, a series of other pinions with oppositely angled, but similarly pitched teeth, surrounding and engaging the first named pinion, and equally adapted to produce end thrust, an internal gear surrounding and engaging said series of pinions and of identical angle pitch and direction, further producing end thrust, for the purpose of preventing the mechanism from equalizing for resistance excepting when one axle section is retarded and the other axle section is accelerated, as is the case with balance gear equalizers used for the purpose, the amount of end thrust being increased by the sum of the sets of teeth engaged, and the angle thereof.

5. Equalizing gearing, comprising a centrally located spiral pinion, a series of oppositely angled spiral pinions surrounding and enmeshed therewith, suitable journals for said series of pinions, a master wheel in which said journals are anchored, a floating member secured on opposite ends of said journals, each alternate one in said series of pinions adapted to be removed leaving the shaft, or stud, only, between master wheel and floating member, an internal spiral gear surrounding and meshed with each pinion in said series, said internal gear being keyed to a shaft in line with the shaft keyed in said centrally located pinion, the whole being suitably inclosed in a casing, and adapted to rotate as a unit with said casing, but adapted to move in said casing on the occasion of separate forces being applied to each section of the shaft to rotate them in opposite directions.

In testimony that I claim the foregoing, I have hereunto set my hand in the presence of two witnesses, this 18th day of June 1919.

EDWIN J. GOULD.

Witnesses:
P. W. EHRHART,
MICHAEL EHRHART.